H. F. BROWN.
STEERING DEVICE FOR AUTOMOBILES.
APPLICATION FILED JUNE 1, 1914.
1,179,343.
Patented Apr. 11, 1916.
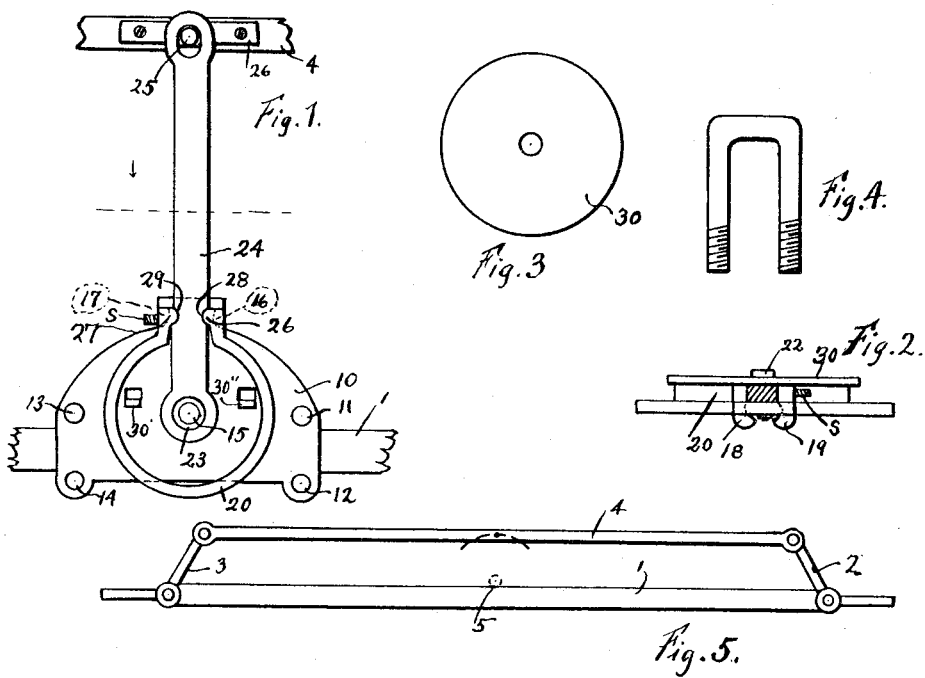
WITNESSES:
INVENTOR.
H. F. Brown,
BY
ATTORNEY.

UNITED STATES PATENT OFFICE.

HUGH F. BROWN, OF SAN FRANCISCO, CALIFORNIA.

STEERING DEVICE FOR AUTOMOBILES.

1,179,343.  Specification of Letters Patent.  Patented Apr. 11, 1916.

Application filed June 1, 1914. Serial No. 842,062.

*To all whom it may concern:*

Be it known that I, HUGH F. BROWN, a citizen of the United States, residing at San Francisco, in the county of San Francisco, State of California, have invented a new and useful Steering Device for Automobiles, of which the following is a specification in such full and clear terms as will enable those skilled in the art to construct and use the same.

This invention relates to a device for holding the wheels of an automobile straight with respect to the body of the car while at the same time the driver is allowed to steer at will, but the wheels will return to their normal position even if the driver does not so return them himself.

It will be understood that the steering gear of some automobiles is so constructed that road shocks to the wheels are transmitted to the steering wheel to such an extent as to render driving uncomfortable. With this device the wheels are held in the straight ahead position and do not get out of line every time they strike a bump.

An object of the invention is to eliminate as far as possible the outward and inward turning of the front wheels of an automobile due to irregularities of the roads or pavements, and at the same time to permit the wheels to be turned freely by the driver when he so desires. The device is provided with levers and springs to cause the front wheels to have a tendency to remain alined with the rear wheels save when turned by the driver.

Another object of the invention is to produce a device which will require but one spring to take up both right and left wheel movements, thereby eliminating the uncertain action of the device and insuring the central positioning of the steering apparatus and avoiding a defect common to devices having two springs since neither spring will always remain at its initial strength.

Another object of the invention is to make use of a necessary construction of the steering gear to avoid wear upon this steering device.

An embodiment of the invention is shown in the drawing in which the same reference numeral is applied to the same portion throughout, but I am aware that there are many modifications thereof.

Figure 1 is a plan view of the device, the cover plate being removed for purposes of illustration. Fig. 2 is an elevation of the device looking in the direction of the arrow, Fig. 1, portions being cut away for illustration. Fig. 3 is a plan view of the cover plate, Fig. 4 shows one of the securing clips, and Fig. 5 is a plan view of the front axle of a car showing the rod connecting the two steering knuckles, the dotted lines indicating the approximate line of travel and center of movement of the center of the connecting bar.

It is to be observed in the first place that the axle 1, the steering knuckles 2 and 3, and the connecting rod 4, Fig. 5, must have a certain relation to each other to properly steer the vehicle. The result of the foregoing construction is that points on the steering knuckle connecting rod move substantially in a circle for a portion of the distance on each side of the center position, the center of movement being close to the front axle in certain types of cars. It is, therefore, possible to have an arm pivoted to the axle over this center which will have practically no longitudinal movement with respect to any part on the connecting rod to which it may be secured. At least the motion will be so slight as to be practically negligible thus eliminating friction and wear.

The device is mounted on a plate 10, which plate has openings to pass the arms of two U bolts at 11, 12, 13 and 14. At the back of the axle the plate has a hole 15 in what is substantially the center of movement of the center of the connecting rod 4, while at the extreme rear the plate has two notches 16 and 17 to hold the hooked ends 18 and 19 of a curved spring 20, said spring extending over the top of the axle.

Adjacent the axle, the plate 10 has an opening 15 through which a bolt 22 passes, a bushing 23 being inserted on the bolt to form a bearing for the link 24, which extends to and is connected with a pin 25 on a plate 26 secured to the top of the connecting rod 4. The back end of the link 24 is slotted enough to permit a slight longitudinal movement of the pin 25 with respect to the link 24, but this movement is so little as to be negligible.

The spring has portions 26 and 27 bearing in notches 28 and 29 in the link 24 and it is held in place by means of a flat plate 30 bolted on the top thereof. The bottom plate has lugs 30' and 30'' punched therein to hold the top plate at the proper distance from the bottom plate at all places. The tension of the spring is adjusted by the screw S, which passes through one end of the spring and contacts with the link 24.

In operation the steering mechanism tends to cause the connecting rod to return to a central position regardless of the direction of movement thereof. The distance the steering knuckle connecting rod moves is so small and the layout of the steering knuckles is such that there is substantially no movement of the pin on the connecting rod longitudinally of the arm contacting therewith, and since the same identical spring is used for movement both sides of the center the same returning force is always applied to the rod thereby tending to hold the steering knuckles in the same position at all times.

Having thus described my invention what I claim as new and desire to secure by Letters Patent of the United States, is as follows, modifications within the scope of the claims being expressly reserved:

1. An auxiliary steering device for automobiles comprising a plate adapted to be secured to the center of the front axle of an automobile, a link pivoted to the plate and adapted to be connected with the steering knuckle connecting rod, a single spring, means whereby said spring may act oppositely to return said link to a central position when moved in either direction, and stops against which the spring acts to hold said link in said central position.

2. An auxiliary steering device for automobiles comprising a plate to be secured to the axle of an automobile adjacent the center thereof, a single link pivoted to the plate and connecting said plate with the steering knuckle connecting rod, a single spring the pressure from which bears upon opposite sides of the link normally holding the same in a central position, the plate having stops to determine said central position.

3. An auxiliary steering device for automobiles comprising a plate carried by the axle of an automobile near the center thereof, a single link pivoted to the plate and connected with the steering knuckle connecting rod, a single spring acting upon opposite sides of the link for returning it to a central position when the steering knuckle connecting rod has been moved in either direction, the plate having stops against which the spring bears to determine the central position for said link, and means to adjust the pressure of the spring on the link.

In testimony whereof I have hereunto set my hand this 25th day of May A. D. 1914, in the presence of the two subscribed witnesses.

HUGH F. BROWN.

Witnesses:
C. P. GRIFFIN,
HENRY B. LISTER.